United States Patent
Choy et al.

(10) Patent No.: US 7,080,085 B1
(45) Date of Patent: Jul. 18, 2006

(54) SYSTEM AND METHOD FOR ENSURING REFERENTIAL INTEGRITY FOR HETEROGENEOUSLY SCOPED REFERENCES IN AN INFORMATION MANAGEMENT SYSTEM

(75) Inventors: David Mun-Hien Choy, Los Altos, CA (US); Sriram Raghavan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 971 days.

(21) Appl. No.: 09/614,369

(22) Filed: Jul. 12, 2000

(51) Int. Cl.
*G06F 17/00* (2006.01)

(52) U.S. Cl. .................. 707/101; 707/102; 707/103 R; 707/201

(58) Field of Classification Search ............ 707/501.1, 707/500.1, 1–10, 100–104.1, 200–206; 715/500–510
See application file for complete search history.

(56) References Cited

U.S. PATENT DOCUMENTS

| | | | | |
|---|---|---|---|---|
| 5,483,596 A | | 1/1996 | Rosenow et al. ........... 380/277 |
| 5,511,186 A | * | 4/1996 | Carhart et al. ................. 707/2 |
| 5,553,218 A | | 9/1996 | Li et al. ...................... 707/102 |
| 5,560,005 A | * | 9/1996 | Hoover et al. ................ 707/10 |
| 5,615,112 A | | 3/1997 | Sheng et al. ................ 707/104 |
| 5,630,127 A | | 5/1997 | Moore et al. ................ 707/104 |
| 5,644,770 A | | 7/1997 | Burke et al. ................. 717/166 |
| 5,734,899 A | | 3/1998 | Yoshizawa et al. ......... 707/203 |
| 5,745,896 A | * | 4/1998 | Vijaykumar ................... 707/1 |
| 5,787,428 A | | 7/1998 | Hart ............................... 707/9 |
| 5,809,317 A | * | 9/1998 | Kogan et al. ............ 707/501.1 |
| 5,826,268 A | | 10/1998 | Schaefer et al. ............... 707/9 |
| 5,937,402 A | | 8/1999 | Pandit ........................... 707/4 |
| 5,978,811 A | | 11/1999 | Smiley ....................... 707/103 |
| 5,991,776 A | * | 11/1999 | Bennett et al. ............. 707/205 |
| 6,012,067 A | * | 1/2000 | Sarkar .................... 707/103 R |
| 6,029,160 A | * | 2/2000 | Cabrera et al. ................ 707/1 |
| 6,038,563 A | | 3/2000 | Bapat et al. .................. 707/10 |
| 6,067,542 A | * | 5/2000 | Carino, Jr. ..................... 707/4 |
| 6,085,031 A | | 7/2000 | Johnson et al. ............. 345/727 |
| 6,085,191 A | | 7/2000 | Fisher et al. ................... 707/9 |
| 6,088,694 A | * | 7/2000 | Burns et al. ................... 707/2 |
| 6,112,209 A | * | 8/2000 | Gusack ....................... 707/101 |
| 6,144,959 A | | 11/2000 | Anderson et al. ............ 707/10 |
| 6,151,623 A | | 11/2000 | Harrison et al. ............ 709/206 |
| 6,154,741 A | | 11/2000 | Feldman ........................ 707/9 |
| 6,189,010 B1 | * | 2/2001 | Isip, Jr. ...................... 707/100 |
| 6,192,405 B1 | | 2/2001 | Bunnell ....................... 709/202 |
| 6,249,873 B1 | | 6/2001 | Richard et al. ............. 713/156 |
| 6,275,824 B1 | | 8/2001 | O'Flaherty et al. .......... 707/10 |
| 6,308,173 B1 | | 10/2001 | Glasser et al. .......... 707/103 R |
| 6,385,730 B1 | | 5/2002 | Garrison .................... 713/202 |
| 6,473,748 B1 | | 10/2002 | Archer ........................ 706/45 |

* cited by examiner

*Primary Examiner*—Jean M. Corrielus
*Assistant Examiner*—Isaac M. Woo
(74) *Attorney, Agent, or Firm*—John L. Rogitz

(57) ABSTRACT

A system and method are provided for an information management system (IMS) to manage heterogenous references in the system, to ensure "referential integrity", without changing the underlying relational database management system (RDBMS) of the IMS. One or more system tables are kept that are not visible to system users. In one embodiment, the RDBMS' mechanisms to ensure referential integrity for homogenous references is used in conjunction with the system table to extend referential integrity to heterogenous references. In another embodiment, the triggers of the RDBMS, in conjunction with the system table, are used to ensure referential integrity of heterogenous references.

6 Claims, 4 Drawing Sheets

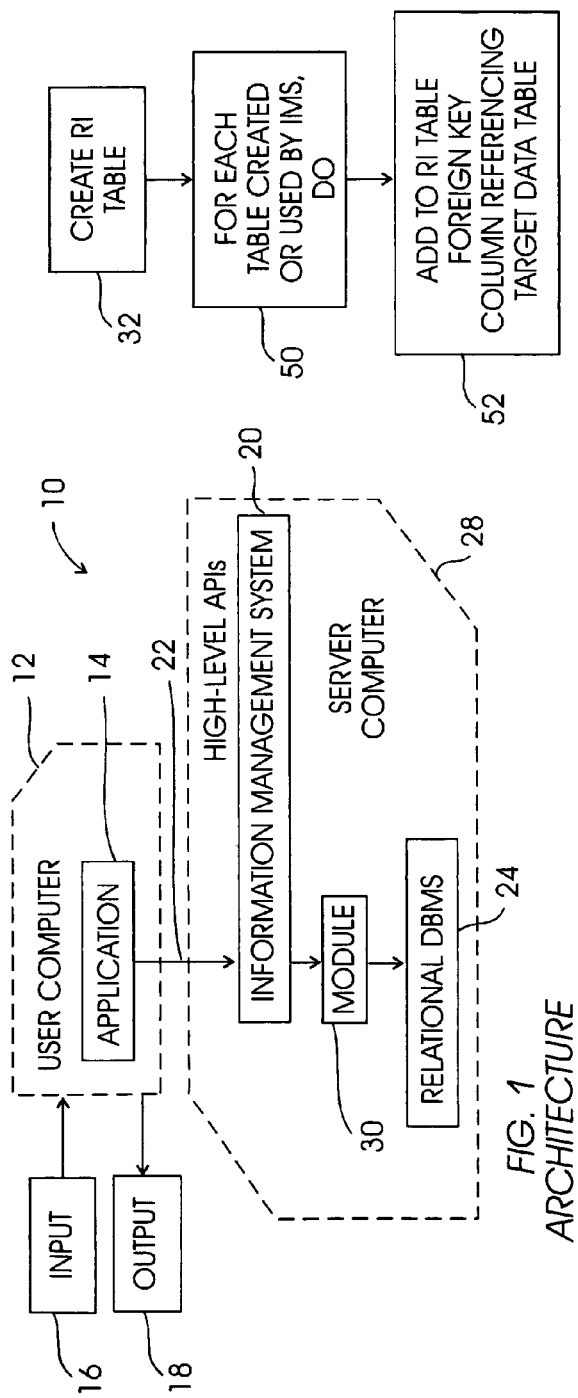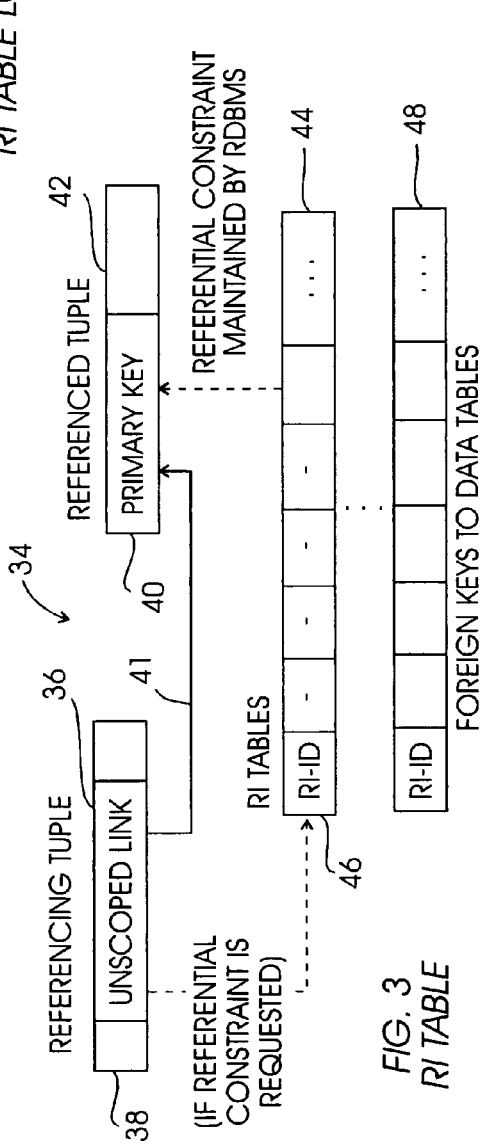

RI TABLE OPERATION

| Name of the Field | Field Size | Byte Numbers | Description |
|---|---|---|---|
| LinkID | 16 | 0 to 15 | Unique identifier for the unscoped link |
| LinkTableName | 18 | 16 to 33 | Name of the linktable in which entry for this link will reside |
| TargetTableName | 18 | 34 to 51 | Name of the target table |
| TargetID | 8 | 52 to 59 | Primary key of the target tuple |
| DeleteSemantics | 1 | 60 | '1' indicates RESTRICT '2' indicates SET NULL '3' indicates CASCADE |
| NeedRIIndicator | 1 | 61 | '1' if referential integrity needs to be maintained for this link. '0' otherwise |
| LinkType | 4 | 62 to 65 | User-specified integer |
| Unused | 4 | 66 to 69 | For future use and expansion |

FIG. 5

| SOURCE TABLE NAME | SOURCE ID | SOURCE COLUMN NAME | DEST. TABLE NAME | DEST. TABLE ID | DEL SEM |
|---|---|---|---|---|---|
| LIST 10 | | | | | |

| SCOPEID | TABLENAME |
|---|---|
| 10 | THESES |
| 10 | CONFPAPERS |
| 10 | SURVEYS |
| 10 | TECHREPS |
| 10 | JOURNALPAPERS |

| TABLENAME | UNLINKCOLNAME | SCOPEID | DELSEM |
|---|---|---|---|
| STUDENTPUBS | PUB | 10 | '1' |
| FACULTYPUBS | PUB | 10 | '1' |

ALTERNATE LOGIC

SYSTEM AND METHOD FOR ENSURING REFERENTIAL INTEGRITY FOR HETEROGENEOUSLY SCOPED REFERENCES IN AN INFORMATION MANAGEMENT SYSTEM

FIELD OF THE INVENTION

The present invention relates to methods and systems for ensuring referential integrity ("no dangling pointers") in databases containing heterogeneously scoped references.

BACKGROUND OF THE INVENTION

Information management systems (IMS) such as digital library servers typically use a relational database management system (RDBMS) to manage data records in a database. As an example, an IMS might manage document data, with the desire that the RDBMS maintain so-called "referential integrity" for elements in the database. What is meant by "referential integrity" is that if a row of a table (referred to as a "target" table) that is referenced by a row in another table (referred to as a "source" table) by means of a foreign key (referred to as a "pointer") is sought to be deleted or changed, either the deletion or change is disallowed or the pointer is removed from the source table, so that no "dangling pointers" (i.e., links to nonexistent database elements) remain.

This is but one example of what is meant by "referential integrity". In general, when one entity refers to another, a dependency relationship is created that represents a referential constraint the integrity of which might be desirable to maintain. As recognized herein, not all such constraints need have their integrity maintained; rather, deciding which constraints to maintain is a balance between application requirements and what can be maintained efficiently.

In existing RDBMS systems such as the system known as "DB2" and marketed by the present assignee, maintaining referential integrity assumes homogenous linking, i.e., that all links from a column of a source table point to tuples in a single predetermined target table. As recognized herein, however, in some cases, such as, for example, digital libraries, a column of links can exist in a table that do not all point to a single common target table. This is because different data types can exist in these cases, so that, for example, one link in a column of a source table might point to a target table representing a particular type of document, another link in the column might point to a target table representing another particular type of document, while yet a third link might point to an image, all of them nonetheless being interrelated. Such links are referred to as "heterogeneously scoped" links, whereby the scope (or target) of these links consists of multiple pre-determined tables. A special case is "unscoped" links, whereby the target tuple of a link can be in any table.

Accordingly, "heterogenous scoping" refers to the ability to create and manage a column of links whose targets are not restricted to being tuples of a single table. It will readily be appreciated by the skilled artisan that heterogenous scoping would provide a flexible and generic linking ability that can be exploited by, e.g., a digital library system to support a relatively more complex data model.

One way to provide heterogenous linking referential integrity is to modify the RDBMS. This is not a trivial task. Accordingly, the present invention is directed to a system and method for providing heterogenous linking referential integrity without modifying the RDBMS, but rather by providing a transparent software layer within the IMS or between the RDBMS and IMS that exploits existing RDBMS functionality to extend referential integrity to heterogeneously scoped links.

SUMMARY OF THE INVENTION

The invention is a general purpose computer programmed according to the inventive steps herein. The invention can also be embodied as an article of manufacture—a machine component—that is used by a digital processing apparatus and which tangibly embodies a program of instructions that are executable by the digital processing apparatus to undertake the present invention. This invention is realized in a critical machine component that causes a digital processing apparatus to perform the inventive method steps herein. The invention is also a computer-implemented method for undertaking the acts disclosed below.

Accordingly, a system is disclosed for providing referential integrity for heterogenous links. The system includes an RDBMS that provides referential integrity for homogenous links, and an IMS communicates with the RDBMS. A software layer is within the IMS or between the RDBMS and IMS for causing the RDBMS to provide referential integrity for heterogenous links.

In a preferred embodiment, the software layer includes at least one table that is maintained by the software layer. The table is accessed upon an attempted deletion or updating of a link, and the attempted deletion or updating is selectively disallowed by the software layer, based on the table. If desired, the software layer can establish at least one trigger, such as an update trigger or delete trigger, that is useful in selectively disallowing operations. Also, if desired the preferred software layer can include at least one stored procedure accessible by an application to insert or delete a tuple while ensuring referential integrity in heterogenous links associated with the tuple.

In another aspect, a computer-implemented method for preventing dangling pointers in heterogeneously scoped links includes providing at least one heterogeneously scoped link (HSL) table that is separate from an RDBMS having stored therein plural tuples arranged in tables. At least one table has a heterogeneously scoped link column, and the table is associated with the heterogeneously scoped link column. The method envisions accessing the HSL table to ensure referential integrity in the RDBMS.

In still another aspect, a computer program product includes computer usable code means that are programmed with logic for ensuring referential integrity in an RDBMS. The RDBMS has at least one table with at least one column of heterogeneously scoped links. The program product includes computer readable code means for accessing a table that is not part of the RDBMS, e.g., that is maintained by the program product. Computer readable code means use the table to ensure that operations on tuples do not result in a heterogeneously scoped link pointing to no tuple.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the present system;
FIG. 2 is a flow chart of the logic for creating an RI table;
FIG. 3 is a schematic representation of an RI table.

FIG. 5 is a schematic representation of a user-defined type for a heterogeneously scoped or unscoped link;

FIG. 6 is a schematic representation of a Link table;

FIG. 7 is a schematic representation of a Scope table;

FIG. 8 is a schematic representation of a Column table; and

DETAILED DESCRIPTION OF THE PREFERRED EMBODIMENT

Figure 4:
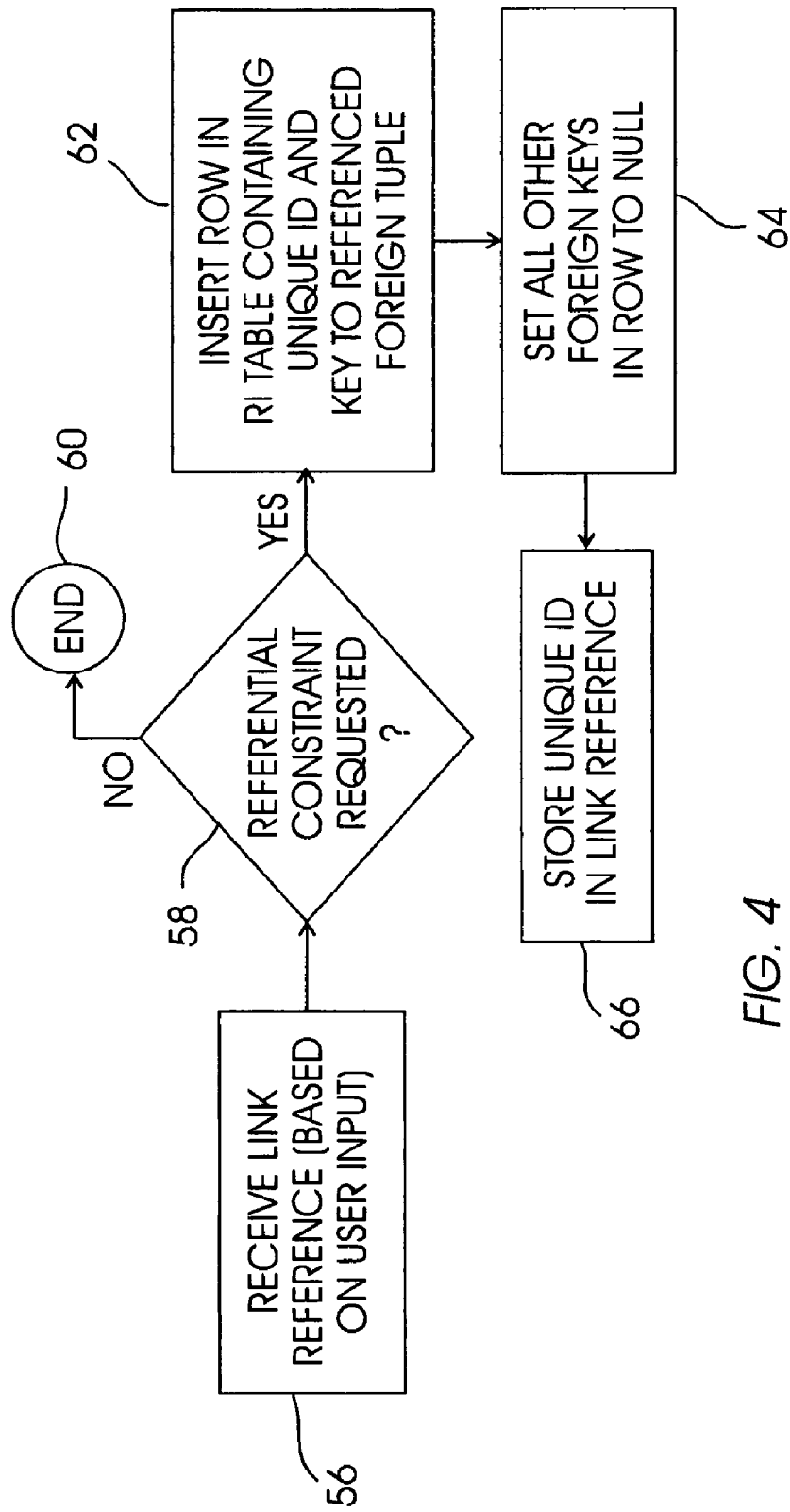
FIG. 4 is a flow chart of the logic for using the RI table.

Referring initially to FIG. 1, a system is shown, generally designated 10. To give the present invention context, an exemplary system 10 having an information management system (IMS) such as a digital library that cooperates with an underlying relational database management system (RDBMS) is described herein, it being understood that the present principles for ensuring referential integrity of unscoped or heterogeneously scoped links (sometimes collectively referred to herein for convenience as "heterogeneously scoped links", or simply "heterogenous links") applies to system architectures other than the one shown.

Accordingly, the system 10 includes at least one user computer 12 having a software-implemented application 14 that generates queries. Input to the user computer 12 is via one or more input devices 16, and query results can be output on an output device 18. The input device 16 can be any suitable device, such as a keyboard, keypad, mouse, joystick, trackball, voice-recognition software, and so on. The output device 18 can be a monitor, a speaker, another computer or computer network, a printer, and so on.

As shown in FIG. 1, the user computer 12 communicates with an information management system (IMS) 20, such as a digital library server, via an IMS communication path 22 using high-level application programming interfaces (API). The IMS 20 communicates with a relational database system (RDBMS) 24, such as the present assignee's DB2, that stores records of documents managed by the IMS 20. One or both of the IMS 20 and RDBMS 24 can be hosted on a server computer 28, or each can have its own associated computer.

As intended herein, either or both of the user computer 12/server computer 28 can be a server computer made by International Business Machines Corporation (IBM) of Armonk, N.Y. Other digital processors, however, may be used, such as personal computers, laptop computers, mainframe computers, palmtop computers, personal assistants, or any other suitable processing apparatus can be used.

In any case, the processor of the computers access appropriate software to undertake the logic of the present invention, which may be executed by a processor as a series of computer-executable instructions. In the preferred embodiment shown in FIG. 1, the software is contained in a software layer or module 30 that is between the IMS 20 and RDBMS 24 in the architecture shown or alternately that is inside the IMS 20, and that is accessed by the IMS 20 and/or RDBMS 24. The instructions contained in the module 30 may be stored on a data storage device with a computer readable medium, such as a computer diskette having a computer usable medium with a program of instructions stored thereon. Or, the instructions may be stored on random access memory (RAM) of a computer, on a DASD array, or on magnetic tape, conventional hard disk drive, electronic read-only memory, optical storage device, or other appropriate data storage device. In an illustrative embodiment of the invention, the computer-executable instructions may be lines of C or C++ or Java code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Commencing at block 32 in FIG. 2, in one embodiment a referential integrity (RI) table is created containing a unique identification column. Such a table is shown in FIG. 3 and designated 34, containing ID column 46. Multiple RI tables 34 can be used in IMS 20 partitions, if desired.

As shown in FIG. 3, an unscoped or heterogeneously scoped link 36 from an RDBMS table 38 ("the referencing tuple") maintains a direct link 41 to a target tuple in a target RDBMS table 42 ("the referenced tuple"). In the present invention, when referential constraint is requested, the link 36 is also related to a row 44 of the RI table 34 by means of a unique identification in the ID column 46. Other rows 48 of the RI table 34 represent other unscoped or heterogeneously scoped links. As indicated at blocks 50 and 52 of FIG. 2, for each data table created or used by the IMS 20, a null-able RDBMS foreign key with a RESTRICT delete rule and referencing the corresponding data table, is added to a foreign key column 54 of the RI table 34.

FIG. 4 shows that at run time, a link reference (i.e., to a referred-to table) is received based on a user input at block 56. For instance, a user might insert or update a tuple to create an instance of a heterogeneously scoped or unscoped link to a referenced tuple. The scoping constraint, if any, is checked. At decision diamond 58 it is determined whether referential constraint has been requested, and if not the process ends at state 60. Thus, the present invention provides for optionally not maintaining referential integrity for a particular link.

On the other hand, when referential constraint is requested the logic moves to block 62 to insert a row into the RI table 34, containing a unique ID identifying the row and a foreign key pointing to the referred-to tuple. Moving to block 64, all other foreign key fields are set to NULL. Proceeding to block 66, the unique is stored in the link reference to refer to the inserted RI table 34 row. For retrieval and traversal operations involving the link, the direct reference 41 (FIG. 3) is used, thereby avoiding the overhead of indirection. To unlink, such as to nullify the link 36 or to delete the referencing tuple 38 from its RDBMS table, the corresponding row 44 of the RI table 34 is also deleted using the ID stored in the link at block 66. To change the target of a link to a different referenced tuple, the steps are the same as those of unlinking followed by those of linking.

To support SET NULL and CASCADE delete rules in addition to the RESTRICT rule, an inverse reference can be added to the RI tables, identifying the source unscoped link instance. Triggers can be defined on the RI tables to change a propagated deletion or update on the RI table to a deletion of the respective RI row, and either an update of the source unscoped link to NULL, or a deletion of the respective referencing tuple.

Now referring to FIGS. 5–9, an alternate means for ensuring referential integrity for non-homogeneously scoped links can be seen. Commencing at block 80 in FIG.

9, an ICMULINK user defined type (UDT) is defined for columns that contain heterogeneously scoped links. In addition, at least one link table is created, as are a Scope table and a Column table.

Specifically, FIG. 5 illustrates the details of the ICMULINK UDT. As shown, the UDT uses a fixed-length character string (preferably a CHAR(70) SQL data type) as the base data type, and sufficient information is encoded in the string to undertake the logic below. The module 30 interprets the string as consisting of a number of fields laid out in a predefined format, but this format is hidden from the application 14, which only uses well-defined user-defined functions (UDFs) to query and operate on the data in the RDBMS 24.

As shown in the particularly preferred ICMULINK UDT shown in FIG. 5, a LinkID field is a 16 byte field that is a unique identifier for an unscoped (or heterogeneously-scoped) link. An 18 byte LinkTableName field contains the name of the link table in which the link resides. Also, an 18 byte TargetTableName filed contains the name of the target table associated with the link.

Still considering FIG. 5, the primary key of the target tuple in the target table is contained in an eight byte TargetID field. The TargetID field contains a 64-bit integer (corresponding to the BIGINT SQL data type). Further, a single byte field represents delete semantics associated with the link. In one preferred embodiment, "1" indicates RESTRICT delete rule, "2" indicates SET NULL, and "3" indicates CASCADE delete. A one-byte field indicating whether referential integrity is to be maintained follows, and then a 4-byte field indicating a user-specified link type. Finally, an unused field is provided for expansion.

In FIG. 6, the link table 74 contains one row for each heterogeneously scoped or unscoped link for which referential integrity is to be maintained. The schema-definition of the Link table 74 in SQL is:

```
CREATE TABLE ICMSTLINKTABLE0001(
    LINKID CHAR(16) NOT NULL,
    SRCTBLNM CHAR(18),
    SRCID BIGINT,
    SRCCOLNM VARCHAR(18),
    DSTTBLNM CHAR(18),
    DSTID BIGINT,
    DELSEM CHAR(1),
    PRIMARY KEY(LINKID)
)
```

In the above schema the 16-byte link identifier is the primary key for the table. Columns 2, 3, and 4 together locate the heterogeneously scoped link column, whereas columns 5 and 6 uniquely identify the referenced tuple. To improve the performance of the below-described triggers, the following index is defined on the Link table 74:

CREATE INDEX ICMDESTIDX ON ICMSTLINK-TABLE0001(DSTTBLNM, DSTID);

Having described the Link table, FIG. 7 shows an exemplary Scope table 76. Essentially, the Scope table 76 groups a collection of tables into a "scope" by correlating a scope ID with the names of the tables in the scope. A table may participate in multiple scopes. The schema-definition in SQL for the Scope Table is:

```
CREATE TABLE ICMSTSCOPEDEFN(
    SCOPEID INTEGER NOT NULL,
    TABLENAME VARCHAR(18) NOT NULL
)
CREATE INDEX ICMSTSCOPEDEFNINDX ON
    ICMSTSCOPEDEFN(SCOPEID)
```

Now considering FIG. 8, an exemplary Column table 78 can be seen. For each heterogeneously scoped or unscoped link column defined in the database, a row is maintained in the Column table. The Column table 78 contains both the name of the column (ULINKCOLNAME) and name of the table containing the column (TABLENAME), along with the scope ID for the link column and a delete semantics byte that is set according to the above principles. The Column table 78 has the following schema definition:

```
CREATE TABLE ICMSTULCOLINFO(
    TABLENAME VARCHAR(18) NOT NULL,
    UNLINKCOLNAME VARCHAR(18) NOT NULL,
    SCOPEID INTEGER NOT NULL,
    DELSEM CHAR(1) NOT NULL,
    PRIMARY KEY(TABLENAME, ULINKCOLNAME)
)
```

Figure 9:
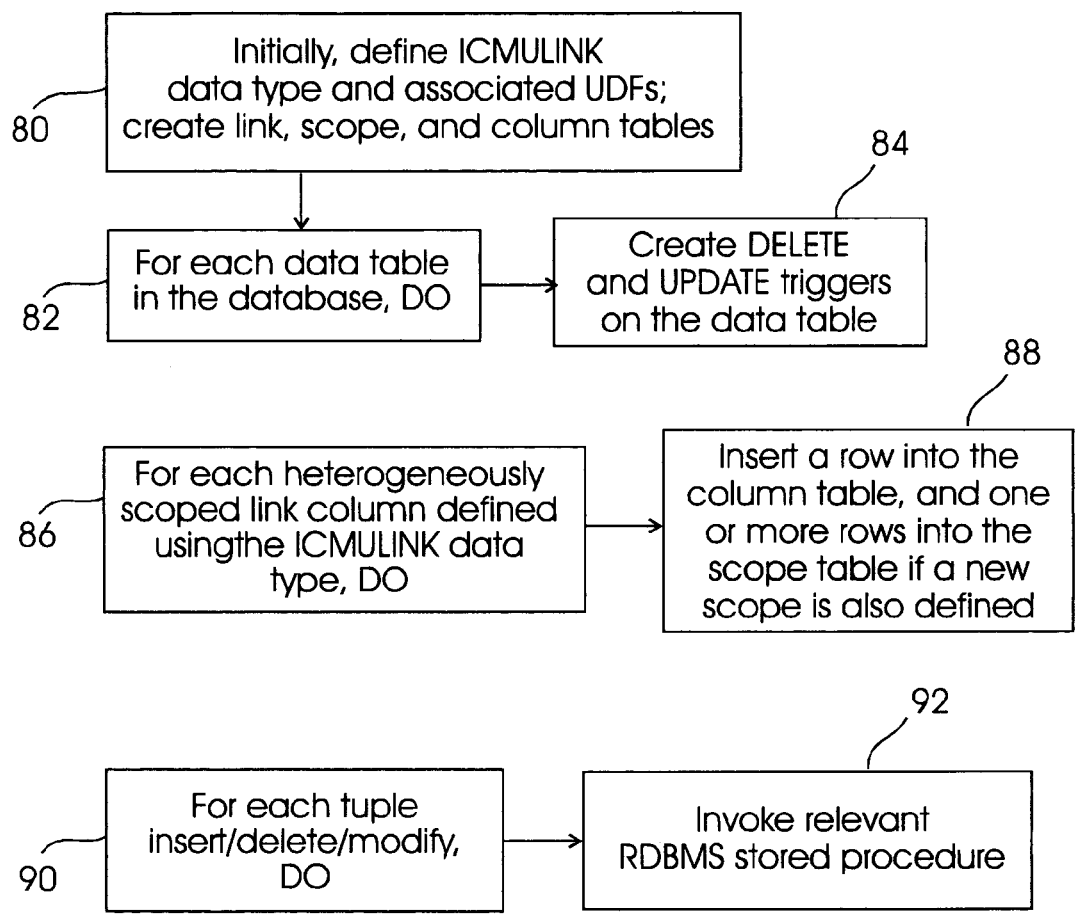
FIG. 9 is a flow chart of alternate logic for using the tables shown in FIGS. 6–8 to ensure referential integrity of heterogeneously scoped links.

At block 82 in FIG. 9, for each table that could potentially be the target of a heterogeneously scoped link, a DO loop is entered in which UPDATE and DELETE triggers are created on the table at block 84. The appropriate one of the triggers is respectively activated only when an update operation changes the primary key of an affected tuple or when a delete operation is executed on one or more tuples. The Link table 74 (and, for column-level operation, the Column table 78) is checked to determine whether a tuple sought to be updated is a target tuple of a heterogeneously-scoped link, and if so the update operation is disallowed. In the case of a delete, the delete trigger checks the Link table to determine whether the tuple is listed as a target tuple of a link with RESTRICT delete semantics associated with it. If so, the delete is disallowed at block 88. Otherwise, the delete is allowed.

Exemplary respective outlines for the update and delete triggers are as follows:

```
CREATE TRIGGER ICMUPDATE000000123
NO CASCADE BEFORE UPDATE OF ID ON T
REFERENCING OLD AS O
FOR EACH ROW MODE DB2SQL
WHEN (EXISTS (SELECT*FROM ICMSTLINKTABLE0001
        WHERE DSTTABLENAME = 'T' AND DSTID = O.ID))
    SIGNAL SQLSTATE '85001' (CANNOT UPDATE TARGET OF
            UNSCOPED LINK)
CREATE TRIGGER ICMDELETE000000124
NO CASCADE BEFORE UPDATE OF ID ON T
REFERENCING OLD AS O
FOR EACH ROW MODE DB2SQL
WHEN (EXISTS (SELECT*FROM ICMSTLINKTABLE0001
        WHERE DSTTABLENAME = 'T' AND DSTID = O.ID AND
            DELSEM='1'))
    SIGNAL SQLSTATE '85002' (CANNOT DELETE TARGET OF
            UNSCOPED LINK)
```

The present invention recognizes that information stored in the ICMULINK attribute might be packaged in a proprietary format with internally meaningful identifiers and codes, an application-friendly interface is desirable. These are provided in the preferred embodiment by a set of UDFs that operate on the ICMULINK attributes. A UDF can be provided to parse the internal structure of an ICMULINK attribute to provide applications with individual field values. Also, a UDF can be provided to determine whether two link attributes passed as input point to the same tuple. Moreover, a UDF can be provided to generate ICMULINK attributes according to the above format using, as input, the target and linktype information, as well as the other parameters shown in FIG. 5. Additionally, a UDF can be provided to retarget an unscoped link, in the event that an application finds it useful to change the target of a link without changing any of its properties.

At block 86 in FIG. 9, for each heterogeneously scoped or unscoped link column defined in the database using the ICMULINK data type, a DO loop is entered in which a row is inserted into the Column table at block 88, and one or more rows are also inserted into the Scope table if a new scope is defined. When applications create or delete tables in the RDBMS 24 and insert or delete or modify tuples according to allowed operations as provided for in FIG. 9 above, the module 30 preferably modifies the tables shown in FIGS. 6–8 accordingly. To do this, the module 30 includes a set of RDBMS-stored procedures that are provided to IMS 20 and applications 14 so that an application can invoke the relevant stored procedure in conjunction with update, delete, and insert operations, as indicated at blocks 90 and 92 in FIG. 9. It is to be understood that, as an alternative, the same logic can be implemented natively in the module 30 instead of a RDBMS stored procedures.

When an application creates a new table, it calls a prepareTarget stored procedure, passing it the name of the table being created and the name of the primary key column. The stored procedure generates and executes the necessary triggers discussed previously at blocks 82 and 84. In C code, this stored procedure can be represented by:
   void ICMPrepareTarget (char*tableName, char*pkeyColumnName)

When a new link column is added as discussed at blocks 86 and 88, a stored procedure is called with the following input parameters to create a new entry in the Column table 78: name of table containing new column, name of column, scopeID associated with the column (0 by default), and column-level delete semantics to be applied (0 by default). In C code, this stored procedure can be represented by:
   voidICMRegisterULinkColumn (char*tableName, char*LinkColumnName, long scopeID, char delSem)

For dropping a table, an application is provided with the following stored procedure, using the table name as sole parameter:
   void ICMDropTable (char*tableName)

The above procedure first checks the Link table 74 for links pointing to tuples in the table to be dropped, and if any exist, the table is prevented from being dropped. Otherwise, all system entries pertaining to the table are deleted.

In contrast, to insert a tuple in a table, the name of the table, primary key of the tuple, link being inserted as part of the tuple insertion, and column name of the link are passed to the following stored procedure, which is invoked by an application:
   void ICMULinkInsert (char*tableName, sqlint64 primaryKey, char*Link, char *LinkColName)

The above procedure first determines whether the target table referenced by the link to be inserted is part of the scope that is associated with the link column, using the Scope table 76 and Column table 78. If the check fails the procedure returns an exception. Otherwise, the procedure next determines whether referential integrity is to be maintained for the new link, and if not returns and ends. When referential integrity is to be maintained, however, the procedure accesses the target table to determine whether the tuple referenced by the new link exists, and if not an exception is returned, but if the tuple is found the procedure creates a new entry in the Link table 74.

For deleting a tuple containing a link attribute, a procedure is called to determine whether referential integrity is to be maintained for the link, and if so the corresponding entry in the Link table 74 is deleted. The procedure is called by an application using the link attribute being deleted as input, and the procedure can accordingly be represented as void ICMULinkDelete (char*link).

When an application wishes to update a link attribute of a tuple, it passes the name of the relevant table, primary key of the tuple, old and new values of the link attribute, and name of the link value being modified to the following stored procedure:
   void ICMULinkModify(char*tableName, sqlint64 primaryKey, char* OldLink, char* NewLink, char* colName).

The procedure combines the above operations of the delete and insert procedures to undertake the update.

To update the primary key of a tuple containing a link attribute, an application sends the new primary key value and link attribute of the tuple to a procedure which, when referential integrity is being maintained, extracts the link ID and locates and modifies the corresponding entry in the Link table 74. The procedure can be represented as:
   void ICMPkeyModify (char* primaryKey, char* uLink)

The above stored procedure first handles the change to the link attribute by invoking the ICMULinkModify stored procedure, passing the "old" primary key to support this update, and then the new primary key is passed to complete the procedure.

Completing the description of the stored procedures, an expected common operation in digital libraries is the migration of a tuple from one table to another. Accordingly, an application wishing to do this can invoke an ICMMigrateTarget stored procedure by passing to it the old and new table names and primary key of the tuple. The procedure first determines, from the Link table 74, whether a link exists having the tuple as a target, and for each such link the new location of the tuple and corresponding link attributes of source tuples are changed in the Link table. This procedure, in C code, can be expressed as void IcMMigrateTarget (char*origTable, char*newTable, sqlint64 primaryKey).

Preferably, an application using the above procedures ensures that the SQL statement and procedure calls are executed together in one atomic statement, so that if the call to the stored procedure does not succeed, the SQL statement can be rolled back.

While the particular SYSTEM AND METHOD FOR ENSURING REFERENTIAL INTEGRITY FOR HETEROGENEOUSLY SCOPED REFERENCES IN AN INFORMATION MANAGEMENT SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. § 112, sixth paragraph, unless the element is expressly recited using the phrase "means for" or, in the case of a method claim, the element is recited as a "step" instead of an "act".

We claim:

1. A computer-implemented method for preventing dangling pointers in heterogeneously scoped links, comprising the acts of:

providing at least one heterogeneously scoped link (HSL) table in a non-RDBMS element communicating with at least one RDBMS, at least one table having a heterogeneously scoped link column, the HSL table being associated with the heterogeneously scoped link column; and accessing the HSL table to ensure referential integrity in an RDBMS.

2. The method of claim 1, wherein the HSL table is accessed when a link attribute is sought to be changed.

3. The method of claim 1, wherein the HSL table is accessed when a tuple is sought to be changed or deleted.

4. The method of claim 1, wherein the HSL table is established by an RI table.

5. The method of claim 1, further comprising providing at least one trigger useful in selectively disallowing operations.

6. The method of claim 1, further comprising providing at least one stored procedure accessible by an application to insert, update, or delete a tuple while ensuring referential integrity in heterogenous links associated with the tuple.

* * * * *